United States Patent [19]

Matsumoto

[11] Patent Number: 5,142,301
[45] Date of Patent: Aug. 25, 1992

[54] GRADATION CONTROL CIRCUIT FOR A THERMAL HEAD
[75] Inventor: Atsuhiko Matsumoto, Tokyo, Japan
[73] Assignee: Oki Electric Industry Co., Ltd., Tokyo, Japan
[21] Appl. No.: 631,085
[22] Filed: Dec. 19, 1990
[30] Foreign Application Priority Data
Dec. 25, 1989 [JP] Japan .................. 1-335742
[51] Int. Cl.[5] .............................................. B41J 2/32
[52] U.S. Cl. ................................ 346/76 PH; 358/298
[58] Field of Search .................... 346/76 PH; 358/298

[56] References Cited
U.S. PATENT DOCUMENTS

| 4,806,950 | 2/1989 | Sekine et al. | 346/76 PH |
| 4,951,152 | 8/1990 | Suzuki et al. | 346/76 PH |
| 4,963,989 | 10/1990 | Morton | 358/298 |
| 5,006,865 | 4/1991 | Kuroiwa | 358/298 |

FOREIGN PATENT DOCUMENTS

| 57-48868 | 3/1982 | Japan . |
| 2090030 | 6/1982 | United Kingdom . |
| 2110036 | 6/1983 | United Kingdom . |
| 2118799 | 11/1983 | United Kingdom . |
| 2196498 | 4/1988 | United Kingdom . |

Primary Examiner—Mark J. Reinhart
Attorney, Agent, or Firm—Spencer, Frank & Schneider

[57] ABSTRACT

A gradation control circuit for a thermal head used for printing an image or the like preferably includes a shift register for receiving gradation data, a selection circuit for selecting one gradation data corresponding to one exothermic element, a decision circuit for determining the level of the data, and a switching element for controlling the heating time of the exothermic element based on the determined level of the data.

8 Claims, 5 Drawing Sheets

1

GRADATION CONTROL CIRCUIT FOR A THERMAL HEAD

BACKGROUND OF THE INVENTION

1. Field of the Invention

This invention relates to a gradation control circuit in general, and more particularly to a gradation control circuit for a thermal head used for reproducing image signals including photographic information concerning a picture or the like.

2. Description of the Prior Art

Japanese Laid-Open Patent Publication No. 57-48868 (48868/1982) in the name of Masatoshi Katoh, entitled "thermal recording device", relates to a control circuit for a thermal head which can be utilized for gradation printing and is herein schematically illustrated in FIG. 1 as one typical conventional example useful for explaining the background of the present invention.

In FIG. 1, a binary recording circuit generally designated by the reference numeral 38 comprises a plurality of exothermic bodies 20a-20c each of which corresponds to one dot or pixel of an image to be printed or reproduced, a plurality of switching elements 23a-23c used for driving or energizing the exothermic bodies 20a-20c, a shift register 33 having a plurality of register stages corresponding to the number of dots and acting as a series-parallel converter, and a latch circuit 35 used for holding output signals from the shift register 33. A gradation recording circuit 34 comprises a reference signal generation circuit 31 for generating a set of reference signals consisting of a signal (0) which is continuously maintained at low level and signals (1)-(7) which are maintained at high level and differ in length respectively, and a data selector 32 having a group of input terminals 21 which receives a gradation code signal of 3 bits from a gradation code signal generator (not shown). Each gradation code signal corresponds to a gradation level for each of the exothermic bodies 20a-20c and is generated repeatedly at a cycle corresponding to a unit-heating time.

In this circuit arrangement, the number of reference signals from the reference signal generator 31 corresponds to the number of steps to be controlled (hereinafter referred to as gradation number or step), and the density or the degree of gradation of an image to be printed is determined by the number of times that one exothermic body corresponding to one dot or pixel is heated for its unit-heating time.

In the gradation recording circuit 34, when the gradation code signal is inputted into the data selector 32 via the input terminals 21, the data selector 32 selects the corresponding reference signal based on the gradation code signal of 3 bits and generates a binary signal which goes high for only a time interval of the gradation code signal provided.

In response to a shift clock signal provided at the terminal 36, the shift register 33 receives the binary signal selected at the data selector 32. Next, in response to data transfer pulses provided at the terminal 37, the latch circuit 35 fetches the output signals in the respective stages of the shift register 33 and latches them in the corresponding locations. The output signals of the latch circuit 35 are applied to the base electrodes of the switching transistors 23a-23c. Since the emitters and the collector electrodes of transistors 23a-23c are connected respectively to ground and the exothermic bodies 20a-20c, which are connected to a terminal 111 to which a recording voltage E is applied, the corresponding exothermic bodies will be energized according to the control signals from the latch circuits 35.

The complete recording of one dot or pixel is accomplished by dividing the heating pulses into a predetermined number (in this case, 9) of unit pulse, controlling the number of unit-heating pulses with reference to the gradation code signal provided, and thereby varying the heating time to the exothermic body.

However, in the conventional example mentioned above, when one picture element is to be printed, it is necessary to transmit gradation data to the shift register 33 for the same number of times as the gradation number. For this reason, assuming that the number of dots is 640 and the gradation number is 64, the printing speed per line can be expressed as (640×64)/(shift clock frequency), so that a time interval of 10.24 msec will become necessary provided that the shift clock frequency is 4 MHz. In addition, if the number of pixels is 640 and the gradation steps are 256, it amounts to 40.96 msec. Therefore, the printing speed obtained by the conventional circuit as illustrated in FIG. 1 cannot be applied to a high speed printer in which the printing time for one line must be limited to less than several seconds, unless the gradation steps are reduced.

SUMMARY OF THE INVENTION

With foregoing situation in view, the present invention has as its primary object the provision of a gradation control circuit for a thermal head, which is capable of accomplishing high speed printing without reducing the maximum value of gradation steps, namely, the total number of times to be controlled stepwise (hereinafter referred to as the gradation step or number).

It is another object of the present invention to provide a gradation control circuit which is very simple in its construction.

It is still another object of the present invention to obtain a high image quality by compensating for the differences in the resistance values the exothermic elements used.

It is yet another object of the present invention to make gradation printing as faithful as possible with respect to the gradation data provided from the outside.

These and other objects of the present invention are attained, according to one embodiment of the invention, by a gradation control circuit including a shift register for receiving the gradation data indicative of the desired density for each of a plurality of exothermic bodies or elements, a first latch circuit for holding the gradation data, a selection circuit for sequentially selecting any gradation data corresponding to one of the exothermic elements from the gradation data held in the first latch circuit, a ring counter the output of which is incremented or deremented one by one in response to clock pulses sequentially provided on its input terminal from the outside, a comparator for comparing the gradation data selected by means of said selection circuit with the output signals of the ring counter and outputting the control signal representing the magnitude or level of the selected data, a second latch circuit for holding the output signals of the comparator, and a switching elements for controlling the heating time of each of the plurality of exothermic elements based on the control signals supplied from the second latch circuit.

BRIEF DESCRIPTION OF THE DRAWINGS

The novel features of the subject invention, as well as the invention itself, and the objects and advantages thereof will be better understood from the following description taken in conjunction with the accompanying drawings in which.

DESCRIPTION OF THE PREFERRED EMBODIMENTS

Figure 1:
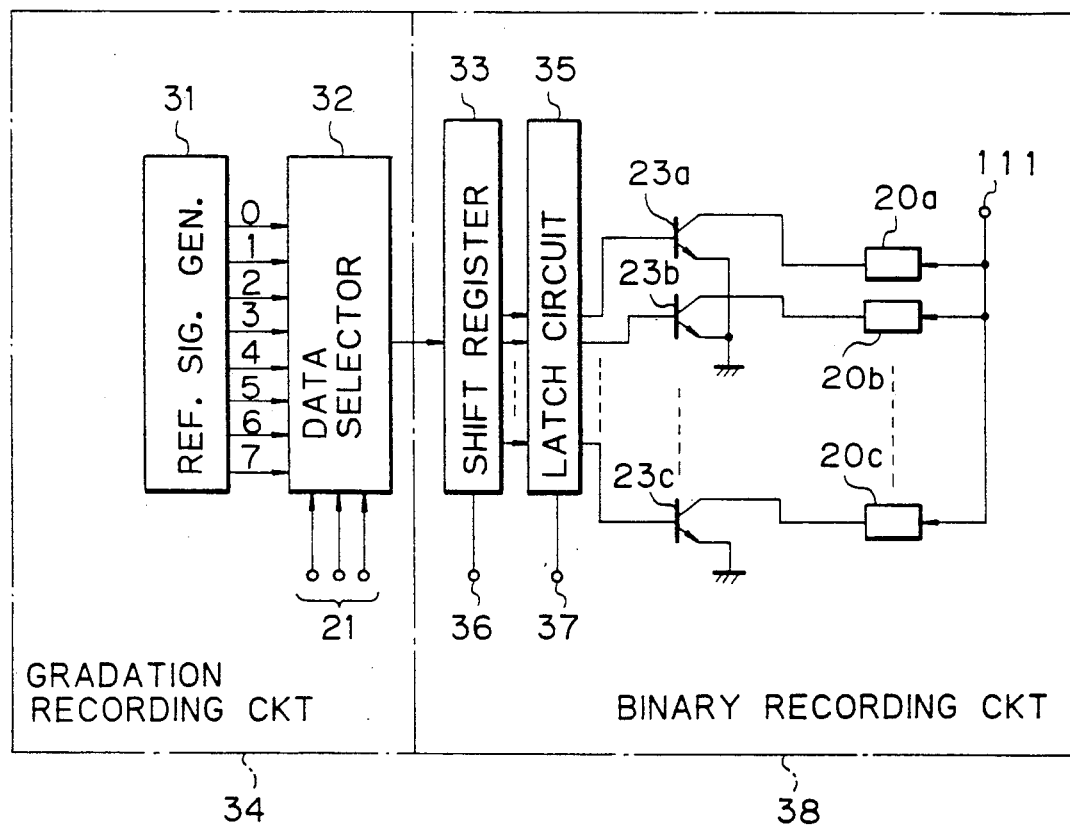
FIG. 1 is a schematic illustration of a gradation control circuit of the prior art.
Figure 2:
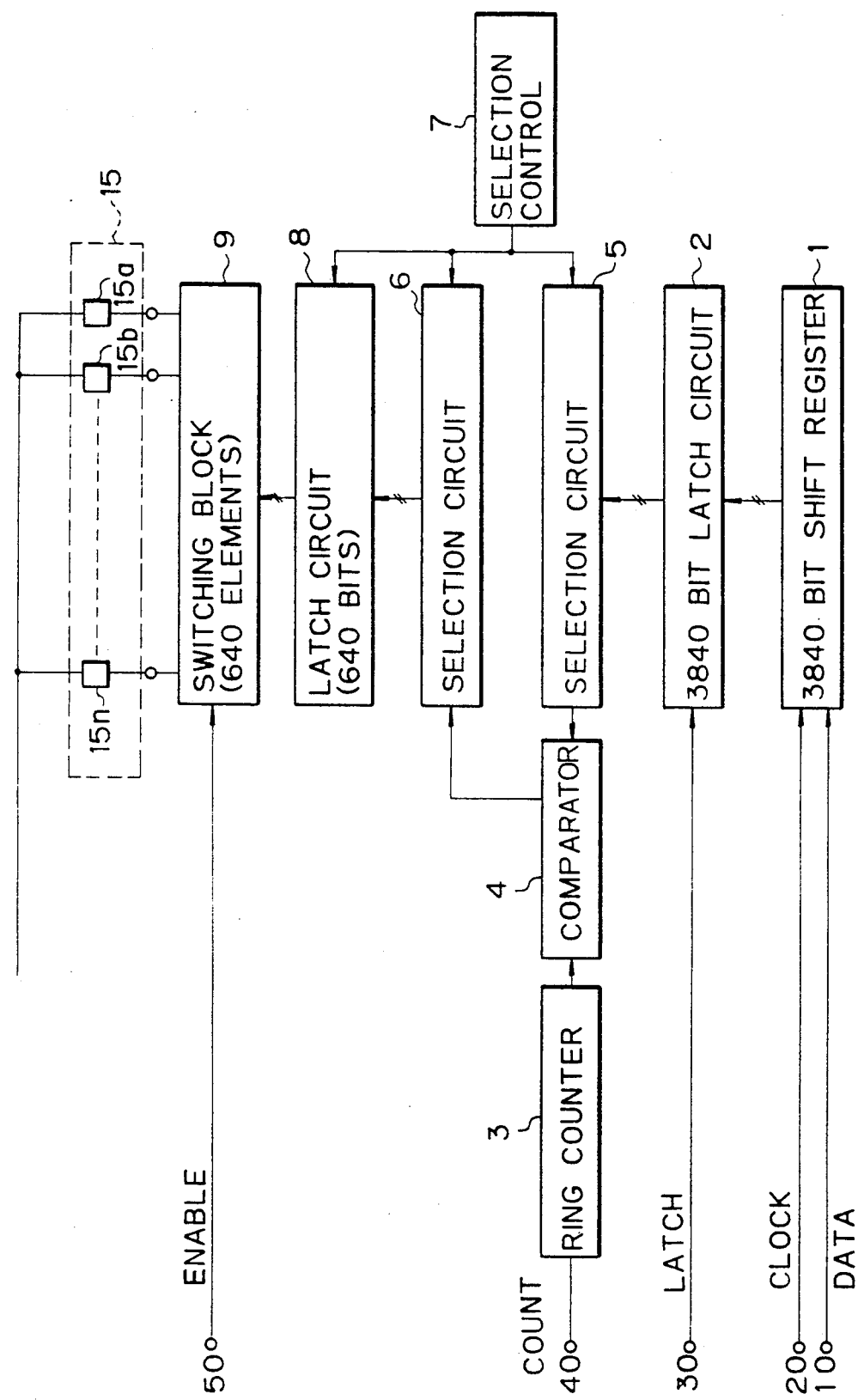
FIG. 2 is a constitutional diagram showing a circuit useful for explaining the gradation control operation of a thermal head in accordance with the present invention.

Referring now to the drawings, and more particularly to FIG. 2, the gradation control circuit of the present invention is therein illustrated in connection with a control circuit applicable to a gradation printing system in which the number of pixels or dots is 640 and the maximum gradation number is 64.

The gradation control circuit according to the present invention comprises, as illustrated in FIG. 2, a 3840-bit shift register 1 having a data input terminal 10 and a clock pulse terminal 20, a 3840-bit latch circuit 2 having a latch input terminal 30 and connected to the shift register 1, a 6-bit ring counter 3 having a count pulse input terminal 40, a 6-bit comparator 4 connected to the ring counter 3, a signal selection circuit 5 connected to the latch circuit 2 and the comparator 4, a signal selection circuit 6 connected to the comparator 4, a 640-bit latch circuit 8 connected to the selection circuit 6, a selection control circuit 7 having one output terminal commonly connected to the circuits, 5, 6 and 8, a switching block 9 consisting of 640 switching elements and having an enable terminal 50 and connected to the latch circuit 8, and a thermal head 15 including exothermic bodies or elements 15a–15n which are connected to respective elements contained in the switching block 9.

In operation, the shift register 1 receives a given number of gradation code signals or data, enough for one line, as one group by way of data input terminal 10 in synchronism with clock signals provided on the clock input terminal 20. The latch circuit 2 fetches the data from the shift register 1 in response to the latch signals provided on the latch input terminal 30 and holds them until the next latch signals are provided on the latch input terminal 30. In this circuit, the shift register 1 is controlled by clock signals provided on the clock terminal 20 in such a manner that it can provide the subsequent group of data to the first latch circuit 2 simultaneously with the completion of printing for the previous group of gradation data.

The ring counter 3 counts incrementing one by one in response to pulses applied to the count terminal 40 and provides a 6-bit signal to the comparator 4. In addition, the selection circuit 5 selects, one by one, the data corresponding to each of the exothermic bodies 15a–15n to be energized and provides the selected data to the comparator 4. Thus, the comparator 4 compares the output signal or 6-bit signal of the ring counter 3 with the data from the latch circuit 2 selected by the selection circuit 5, and provides a control signal with which each exothermic element will be energized later for an assigned period of time, to the latch circuit 8 through the selection circuit 6. As will be understood from the foregoing, the comparison operation by the comparator 4 for each gradation data latched in the latch circuit 2 is repeated until all the control signals for the respective exothermic elements 15a–15n are determined.

In response to instructions from the selection control circuit 7, the selection circuit 6 selects locations of the second latch circuit 8, one by one, to receive the control signals from the comparator 4. Then the control signals in latch circuit 8 drive some or all of the switching elements 9 for the specified period of time, when the enable signal is applied to the enable terminal 50, thereby energizing the respective exothermic elements 15a–15n arranged on the surface of the thermal head 15.

Figure 3:
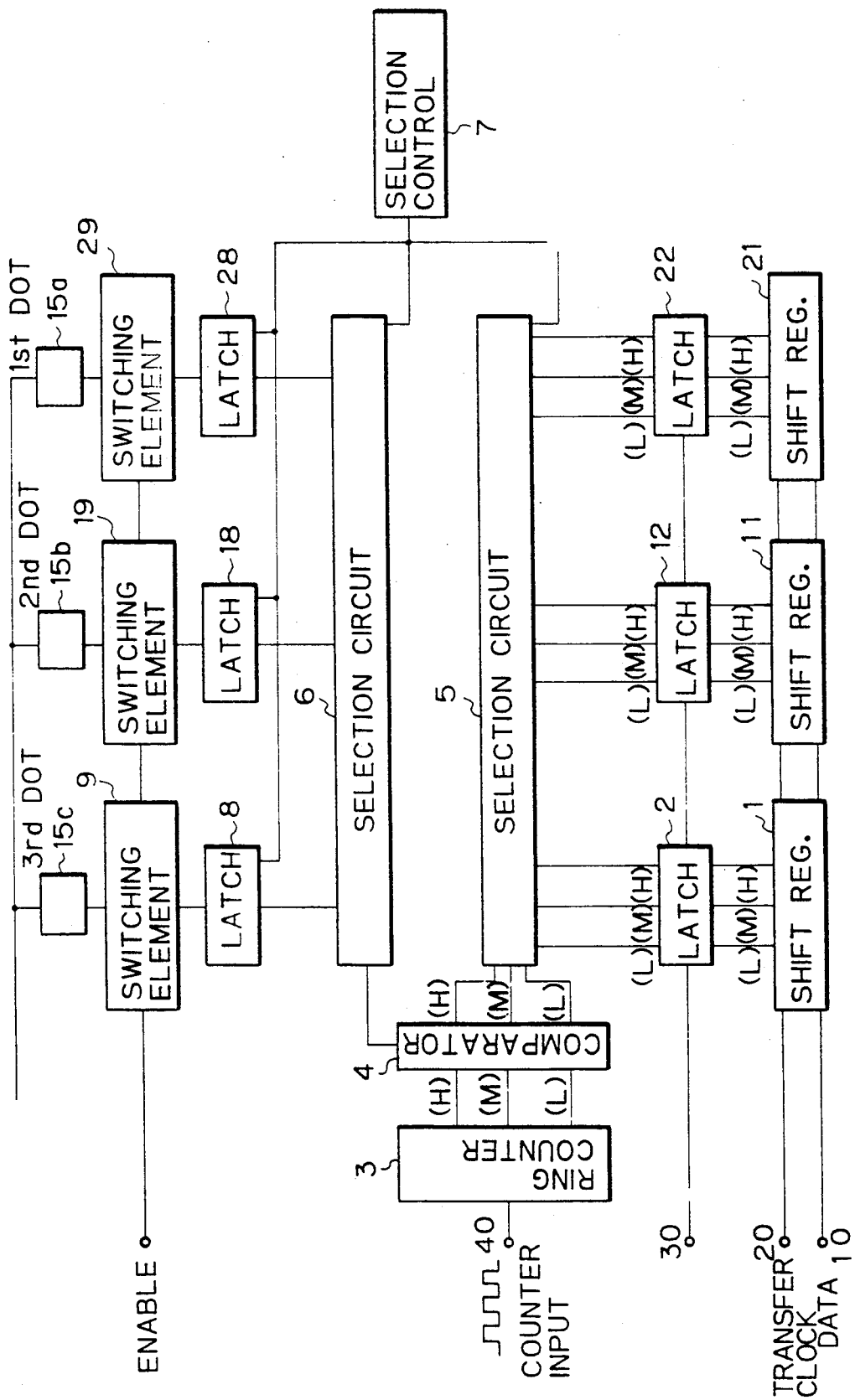
FIG. 3 is a constitutional diagram for one specific embodiment in which three bits are used for denoting the gradation data.
Figure 4:
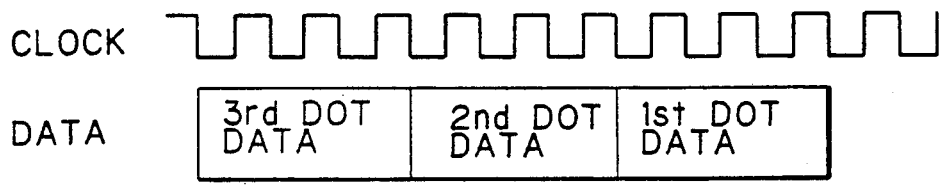
FIG. 4 is a diagram useful for explaining the contents of a shift resister 1 shown in FIG. 3.
Figure 5:
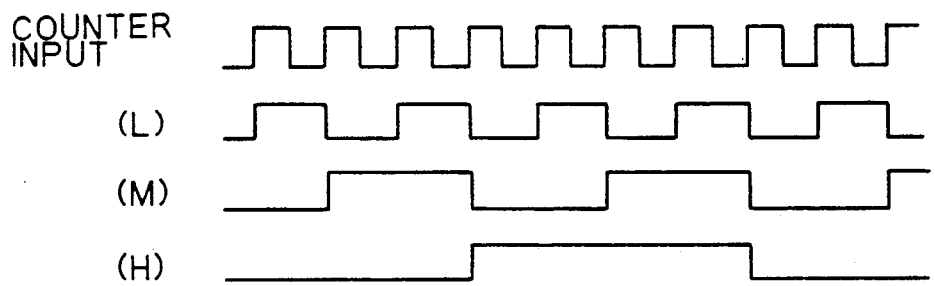
FIG. 5 shows input/output waveforms of a ring counter in the embodiment shown in FIG. 3.
Figure 6:
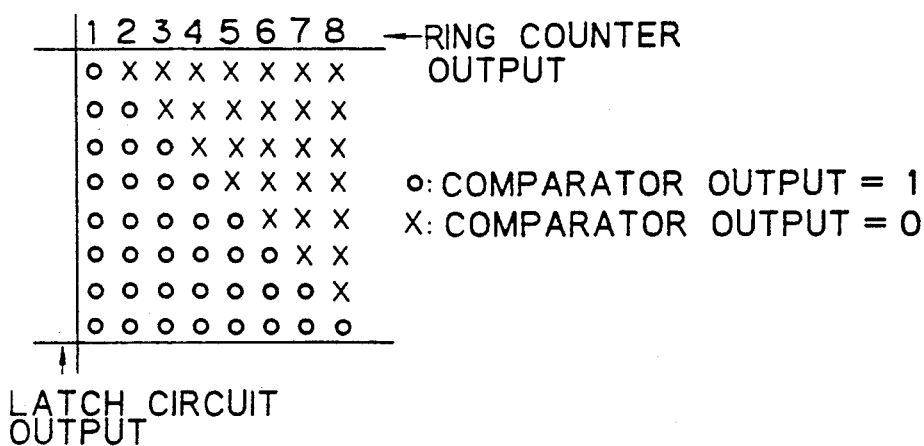
FIG. 6 is a diagram useful for explaining the input/output signals of a comparator in the embodiment.
Figure 7A:
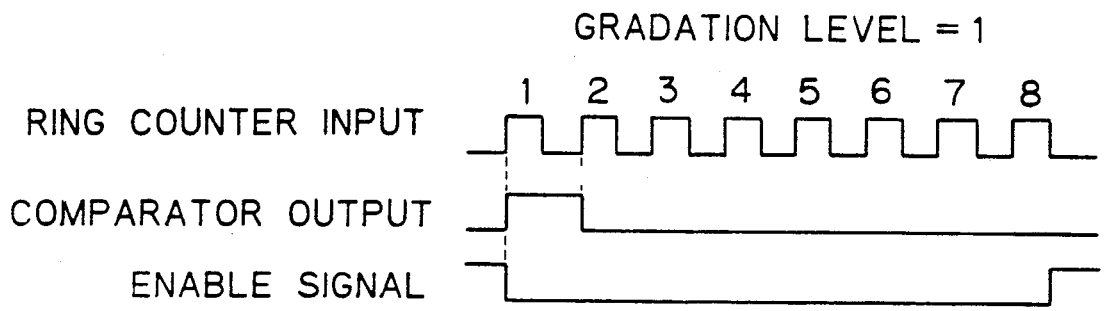
FIGS. 7A, 7B and 7C show waveforms obtained at the output of the comparator in the embodiment of FIG. 3 for different gradation levels 1, 4 and 8, respectively.
Figure 7B:
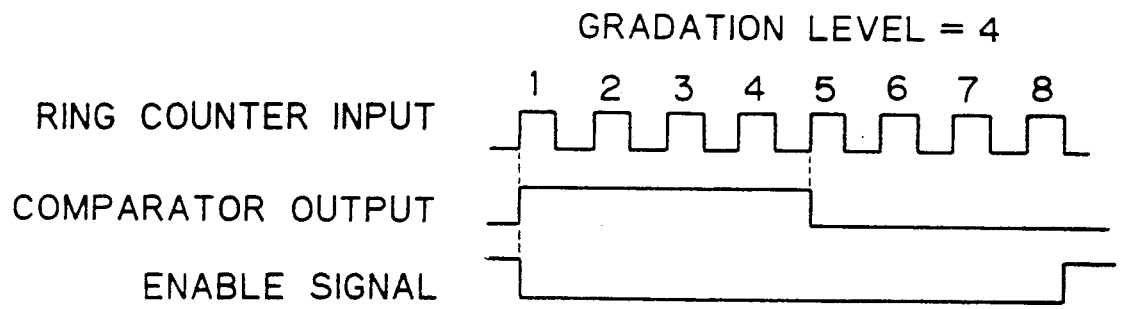
Figure 7C:
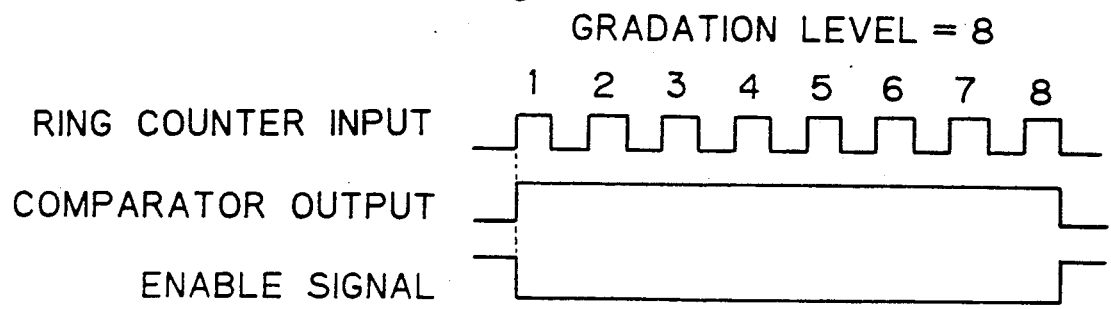

FIGS. 3 to 7C are presented for explaining the gradation printing operation in the case where the gradation is controlled in eight steps (3-bit data). FIG. 3 shows a constitutional diagram of a gradation control circuit for controlling the gradation or density in eight steps, FIG. 4 is a diagram used for explaining the gradation data entered into shift registers 1, 11 and 21, FIG. 5 shows input/output waveforms of the ring counter 3, FIG. 6 is a diagram showing the relationship between data from any of the latch circuit 2, 12 or 22 and the output of the ring counter 3, and FIGS. 7A to 7C are waveforms showing the relationship among the input pulses to the ring counter 3, the output signals of the comparator 4 for different gradation levels, and the enable signal applied to the switching blocks 9, 19 and 29.

In operation, the gradation data of three bits from the outside are sequentially provided to the shift registers 1, 11 and 21 in synchronism with the clock signals applied to the clock terminal 20 in such a manner that the first three bits corresponding to the first dot data are received in the shift register 21, the next three bits corresponding to the second dot data are received in the shift register 11, and the successive three bits corresponding to the third dot data are received in the shift register 1, as shown in FIG. 4.

Next, the data in the shift registers 1, 11 and 21 are shifted to latch circuits 2, 12 and 22 in response to latch signals applied to a latch terminal 30 and maintained therein, and simultaneously therewith, the shift registers 1, 11 and 22 receive the gradation data to be subsequently reproduced.

As illustrated in FIG. 5, the ring counter 3 receives, at its input terminal 40, a sequence of clock pulses of a fixed cycle and outputs the signals having waveforms L, M and H to the comparator 4.

As indicated in FIG. 6, the comparator 4 compares, one by one, the outputs or data of the latch circuits 2, 12 and 22 supplied through the selection circuit 5 with the output of a ring counter 3, and produces the control signal of high level (H level: indicated by a circle) at a time when the former becomes larger than the latter.

The outputs of the comparator 4 are applied to one-bit latch circuits 8, 18 and 28 via a selection circuit 6. In the data transaction operation described hitherto, the selection circuits 5 and 6 will select the corresponding latch circuits in accordance with the instruction from a selection control circuit 7. For example, the selection circuits 5 and 6 are so operated that, when the selection circuit 5 selects the latch circuit 22, the selection circuit 6 selects the latch circuit 28, and while the selection circuit 5 selects the latch circuit 12, the selection circuit 6 selects the latch circuit 18, and so on. In addition, the selection control circuit 7 selects each latch more than once sequentially within the period of one cycle of the count signals supplied to the ring counter 3.

The data of latch circuits 8, 18 and 28 are used to cause switching elements 9, 19 and 29 to conduct when the data from the latch circuits are at high levels and the enable signal is at a low level, thus causing the exothermic elements 15a, 15b and 15c to be energized simultaneously.

As can be clearly seen from the diagrams illustrated in FIGS. 7A to 7C, which represent three examples for different gradation levels, namely, 1, 4 and 8, in the case of the embodiment shown in FIG. 3, density control in eight steps is made possible.

In other words, the energization of exothermic bodies or elements 15a-15c at the final stages is effected through the steps of receiving the gradation bit signals of 3 bits at the shift registers 1, 11 and 21, holding the gradation bit signals in the latch circuits 2, 12 and 22, comparing the gradation bit signals from the latch circuits 2, 12 and 22 with the output signals of the ring counter 3, and turning the switching elements 9, 19 and 29 on for a time interval that is determined based on the results of the comparison. At this juncture, the time duration for energizing the exothermic bodies will be determined by the elasped time from the start of counting at the ring counter 3 till the output signal of the ring counter 3 exceeds the magnitude of gradation data, thereby changing the amount of heat dissipated by the exothermic or heating elements, and thus causing the printed letter or picture to have the desired density.

As will be understood from the foregoing, since the transfer of the gradation data for one pixel from the terminal 10 need not be performed separately for the same number of steps as the gradation number, as in the case of conventional example indicated in FIG. 2, a high speed printing can be achieved even if the gradation number is increased. In particular, the whole circuit configuration is simplified by use of an unique combination of only one comparator 4 and two sets of selection circuits 5 and 6.

Besides, by using a read-only memory (ROM) which contains encoded data for the resistance values of the exothermic elements, the variations in the resistance values of the heating bodies can be compensated for by invoking the data and using them as part of the gradation data, thereby making it possible to obtain high quality pictures.

What's more, even if the printing density on a thermal recording medium is nonlinear with respect to the pulse width used for printing, the pulse width can be freely varied by changing the cycle of input signal applied to the ring counter, so that gradation the printing according to the gradation data can be faithfully performed.

According to our experiments, it was found that the actual data transmission speed, when the total number of dots per line was 640 and the driving frequency was 4 MHz, was 0.96 ms for 64 gradation steps (6 bits), and 1.28 msec for 250 gradation steps (8 bits). This means that, if the gradation control circuit of the present invention is employed, a high speed printer which is more than several ten times faster than the prior art can be achieved.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included herein.

We claim:

1. A gradation control circuit applicable to a thermal head having a plurality of exothermic elements which are heated for variable heating times and used for printing an image with a given gradation on a recording medium, comprising:

data reception means for receiving gradation data having a magnitude indicative of a desired density for each of the plurality of exothermic elements;

first storage means for holding the gradation data from said data reception means, the first storage means having a plurality of bit storage locations;

selection means for sequentially selecting the gradation data from said first storage means;

level decision means for determining the magnitude of the selected gradation data and outputting a control signal for each of the plurality of exothermic elements;

selection control means for instructing the selection means to transfer gradation data from instructed bit storage locations of the first storage means to the level decision means;

second storage means for holding the control signal from said level decision means; and switching means for controlling the heating time of a corresponding exothermic element based on the control signal from said second storage means.

2. A gradation control circuit according to claim 1 wherein said data reception means comprises a shift register for receiving the gradation data to shift the data therein, and the gradation data received by said register are in the form of digital numbers.

3. A gradation control circuit according to claim 2 wherein said first storage means comprises a latch circuit interconnected to said register for holding the gradation data.

4. A gradation control circuit according to claim 1 wherein said level decision means comprises a ring counter for incrementing an output one by one up to a maximum number corresponding to a maximum number of bits assigned to the gradation data, and a comparator for comparing the gradation data from said first storage means with the output of said ring counter to produce the control signal used for driving said switching means.

5. A gradation control circuit according to claim 4 wherein said second storage means comprises a latch circuit interconnected to said comparator for holding the control signal.

6. A gradation control circuit for use with a thermal head to print an image with a given gradation on a recording medium, the thermal head having a sequence of exothermic elements, comprising data reception means for receiving a sequence of multi-bit gradation data words, each having a magnitude indicative of a desired printing density;

storage means for receiving the sequence of gradation data words from the data reception means and for holding the sequence of gradation data words;

comparator means, having a first digital data input port, a second digital data input port, and an output port, for comparing data at the first and second input ports and providing a comparison result signal at the output port;

a counter connected to the first digital data input port of the comparator means;

a sequence of switching elements, each switching element being connected to a respective exothermic element;

a sequence of latches, each latch being connected to a respective switching element; and selection means for sequentially conveying gradation data words from the storage means to the second digital data input port of the comparator means while sequentially conveying the comparison result signal at the output port of the comparator means to the latches.

7. The gradation control circuit of claim 6, wherein the data reception means comprises a shift register.

8. The gradation control circuit of claim 7, wherein the storage means comprises a plurality of latches.

* * * * *